Dec. 5, 1967 W. T. JACKSON 3,356,555
METHOD AND APPARATUS FOR THE MANUFACTURE OF HONEYCOMB PRODUCT
Filed Oct. 29, 1964 2 Sheets-Sheet 1

INVENTOR.
WENDELL T. JACKSON
BY
Townsend and Townsend
ATTORNEYS

Dec. 5, 1967          W. T. JACKSON          3,356,555
METHOD AND APPARATUS FOR THE MANUFACTURE OF HONEYCOMB PRODUCT
Filed Oct. 29, 1964          2 Sheets-Sheet 2
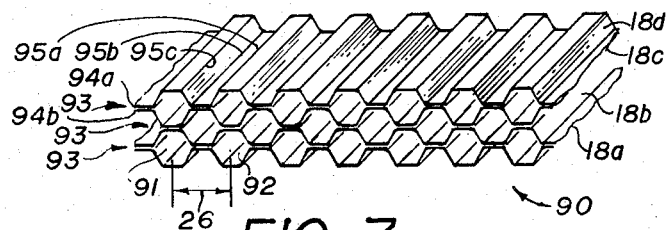
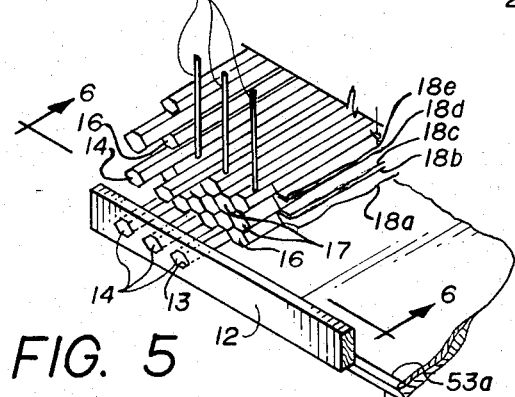
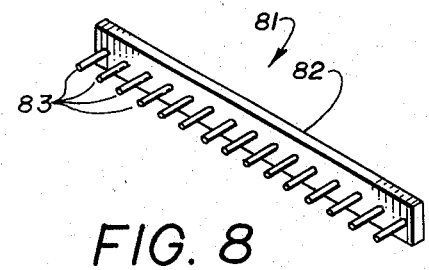
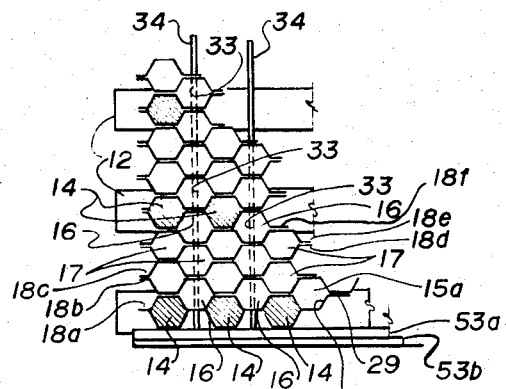
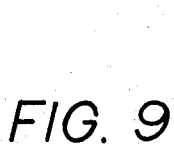
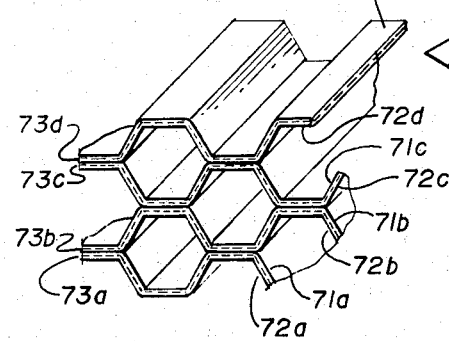
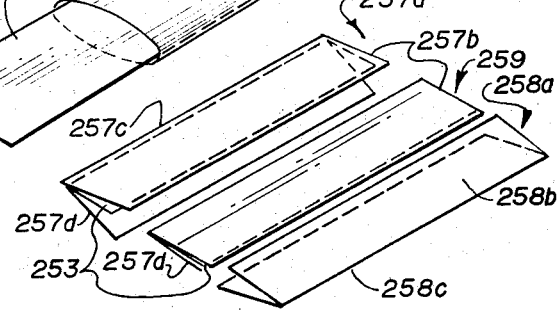
INVENTOR.
WENDELL T. JACKSON
BY
Townsend and Townsend
ATTORNEYS з,356,555
Patented Dec. 5, 1967

3,356,555
METHOD AND APPARATUS FOR THE MANUFACTURE OF HONEYCOMB PRODUCT
Wendell T. Jackson, Pleasant Hill, Calif., assignor to Hexcel Corporation, a corporation of California
Filed Oct. 29, 1964, Ser. No. 407,322
4 Claims. (Cl. 156—205)

ABSTRACT OF THE DISCLOSURE

A method of making cellular honeycomb from non-rigid plastic sheets by successively stacking layer on layer corrugated sheets and inserting in each successive row of half cells solid mandrels until a honeycomb section of desired dimension is attained, and with said mandrels occupying each cell opening and acting to jig and hold the sections together during the heat bonding and curing cycle.

---

This invention relates to a method and equipment for making formed honeycomb materials.

There are at least two basic ways by which honeycomb is made commercially at the present time, the so-called "expansion" and "pre-corrugation" methods. In the expansion method, flat ribbons or sheets of material are superimposed or stacked upon one another and bonded together by adhesive or other means along spaced parallel bonding lines which join adjacent sheets and with the bonding lines of such sheets disposed in staggered relation to one another. With the sheets or ribbon thus securely joined, the material can be cut to desired thickness and expanded into an open cellular honeycomb type structure; the preferred sequence for the steps of cutting and expanding depends upon the nature of the ribbon material. Prior art examples of the expansion method of making honeycomb may be found in U.S. patents to Steele, 2,610,934; May, 2,734,843 and 2,428,979; and Lincoln et al., 2,553,054.

In the practice of both the expansion and pre-corrugation techniques, it is sometimes desirable to utilize honeycomb ribbon material of a plastic or reinforced plastic substance. Some plastic precursors, particularly those known as the polyimides and polybenzimidazole, heat soften at relatively low temperatures (200° F.–300° F.) at which they may be bendably and accurately deformed as by corrugation of resin impregnated glass cloth; however, special techniques, further explained in the detailed specifications to follow, must be employed in such operations because the polyimides, polybenzimidazole, and like plastics, are tacky at their softening temperature and tend to stick to external apparatus which they contact such as that used in corrugating. After corrugating, these plastics may be elevated to their curing temperature at which point they take on a permanent set and thereafter, irrespective of temperature exposure and other environmental conditions, remain permanently formed in a hardened surface condition.

When using the above type plastic materials in either of the aforementioned known methods for making honeycomb, it is necessary to employ relatively complex processes to bond the nodes of adjacent ribbon material and form the characteristic honeycomb cells to achieve the final honeycomb structure. In the case of the expansion process, bonding together in a stack is done before the honeycomb ribbons are expanded, the latter step being subsequently performed under conditions of controlled applied heat necessary to soften the ribbon to avoid damage during expansion.

In the case of the precorrugation method, separate sheets of ribbon material are first pre-corrugated and then bonded together either with a separate step of adhesive application or, in the case of metallic materials, by individually and sucessively bonding layers of half-cell ribbons using known welding techniques.

Thus an object of the present invention is to teach a method of manufacturing fully-formed honeycomb from plastic materials in essentially a one-phase operation after corrugation of the separate sheets. Such a method has particular application to substances which can be corrugated at one condition, for example at a given temperature, and then, simultaneously, joined along their node lines and permanently formed in final cellular shape at a second temperature. A feature and advantage of this method is that the latter single step of joining or bonding and permanently forming the honeycomb cells eliminates the need for a separate adhesive material and its application along the nodes of the precorrugated honeycomb strips.

Another feature and advantage of this invention is that the process taught obtains maximum utility of those thermosetting plastic mateirals that have a characteristic softening temperature and a higher curing temperature at which both permanent deformation and bonding may be caused. When strips of such substances are treated by the novel method of this invention, precise corrugating is performed at the softening point and joining at the nodes is caused at the curing temperature while permanent forming of the structure is also being achieved.

Still further, the advantage of minimizing the steps in making honeycomb structure from precorrugated material as taught by this invention may also be applied to substances other than two-stage thermosetting plastics. For example, metallic web material may be used which corrugates under normal conditions and which may be treated as a unit in accordance with the novel method and apparatus of this invention to join adjacent nodes without using separate adhesive means or separate successive steps of welding. Such feature and advantage anticipates a novel application of explosive welding or diffusion welding techniques, known expedients in the art and not further explained herein. (For reference to explosive welding see "The Explosive Working of Metals," Navord Report 7,033,133–44e; for diffusion welding in the art of making honeycomb see, for example, the United States patent to Baxter, No. 2,999,306.)

Another object of the present invention is to provide a novel apparatus and technique to corrugate sheets or strips of ductile material, to jig such sheets in relation to successive layers of material which have been corrugated, and thus form a honeycomb structure held together by mechanical means ready for final stages of simultaneous forming and joining at the node lines.

A further object is to provide a unique roller device to corrugate strips of material prior to permanent curing and joining at the node lines.

Another object of this invention is to teach a novel method of corrugated plastic sheets at their softening temperature despite any tendency to be tacky or to stick to the corrugating apparatus. This is achieved by the novel application of a sandwich arrangement wherein the plastic is enclosed by aluminum foil or other suitable material, heated and then corrugated after which the foil or other covering is peeled away and the corrugated sheet further processed as hereinafter more fully described.

Another feature of this invention is that the novel holding apparatus taught herein for the practice of this new method to form the ribbon into final honeycomb core sections excludes air therefrom and thus prevents oxidation or degrading of the material being processed. Hence, initial forming may be done in the atmosphere without special environmental control and then, after partial curing and forming causes a stable honeycomb structure to be formed, the holding apparatus may be removed and other steps of treatment may be applied if necessary or desirable.

A further feature of this invention is that the weight of the holding apparatus or jigging fixture creates a certain threshold pressure upon the successive layers of corrugated ribbon material and, by so doing, prevents certain undesirable side effects such as foaming of plastic materials from occurring during the curing stage. Certain additional pressure may be applied during the latter stage to assure proper bonding.

Other objects of the present invention will become apparent upon reading the following specification and referring to the accompanying drawings in which similar characters of reference represent corresponding parts in each of the several views.

In the drawings:

FIGURE 5 is a partial perspective view of the apparatus shown in FIGURE 1 used in another stage of the novel method of this invention.

FIGURE 6 is a partial sectional elevation taken along line 6—6 of FIGURE 5.

FIGURE 7 is a perspective view of a section of a typical product produced by the novel method and apparatus of this invention.

FIGURE 8 is a perspective view of a tool developed for use in this invention.

FIGURE 9 is a perspective view showing a material developed for use in one practice of the novel process of this invention.

FIGURE 10 is a partial perspective view of the product of this invention resulting from the use of material indicated in FIGURE 9.

FIGURE 11 is a perspective view showing my novel method practiced in another manner in respect to forming a sandwich for corrugation.

Figures 1A, 1B, 1C, 2, 3, 4:
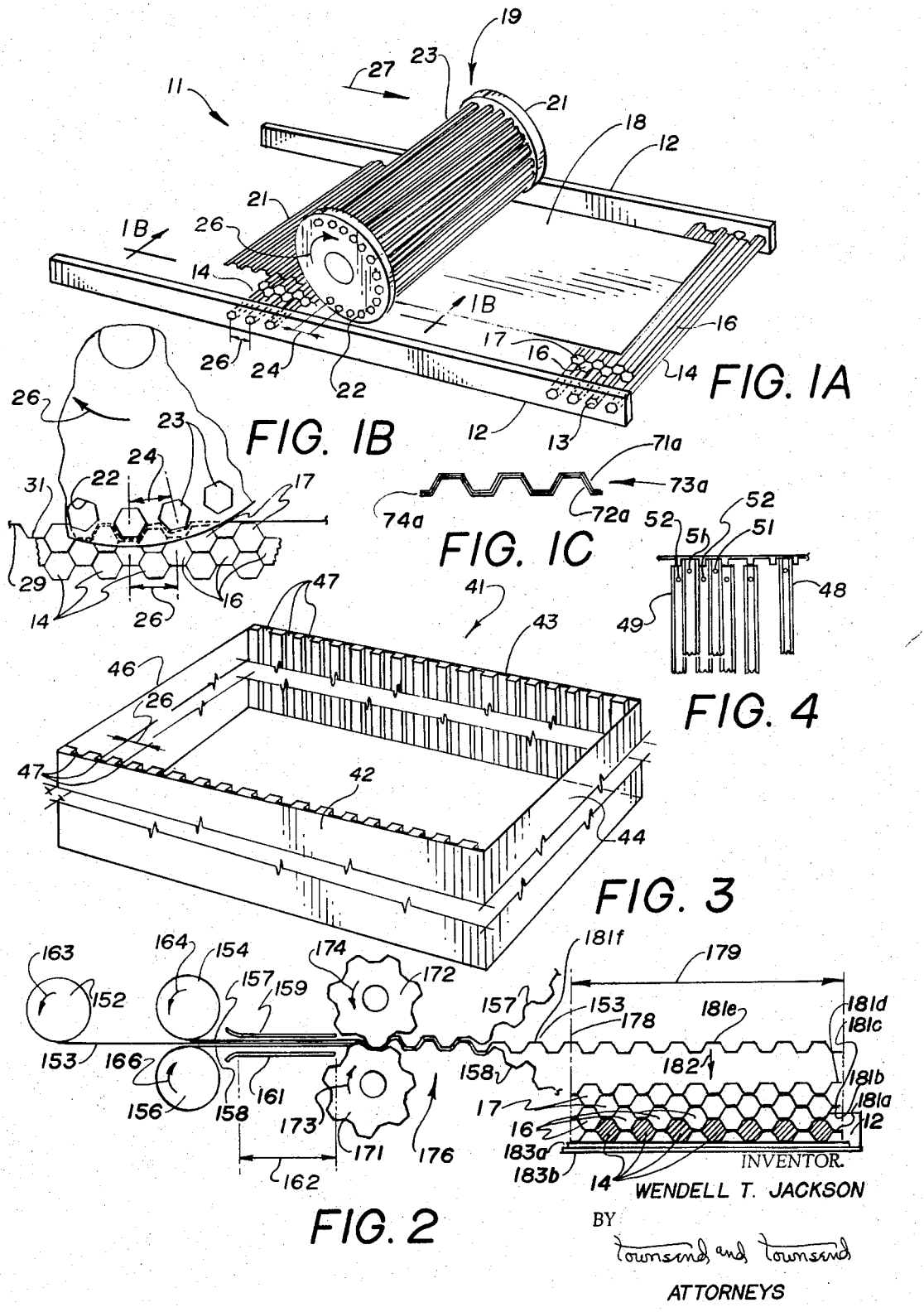
FIGURE 1A is a perspective view showing one embodiment of the apparatus of this invention.
FIGURE 1B is a partial enlarged side elevation taken along line 1B—1B of FIGURE 1A.
FIGURE 1C is a partial side view of one type of ribbon corrugated ribbon material as prepared by the method and apparatus herein.
FIGURE 2 is a partial schematic elevation showing the practice of one method and apparatus of this invention.
FIGURE 3 is a partial perspective showing one embodiment of additional apparatus employed in the practice of this invention.
FIGURE 4 is a partial plan view showing the apparatus of FIGURE 3 with other elements of that apparatus embodiment.

One embodiment of this invention is a method and apparatus by which strips of material are jigged and corrugated to form a strip of half honeycomb cells. The formed strips are then arranged in a holding jig so that successive strips of the corrugated material can be placed and rigidly held in final relation to preceding half-cell strips forming honeycomb structure of desired depth. Then, by application of heat, or heat and shock, depending on the type of ribbon material used, the honeycomb structure, while held in the proper spaced relation, is permanently formed and bonded at adjacent contacting nodes of the corrugations. Finally, the jigging apparatus is removed and the completed honeycomb structure ready for use or further treatment if necessary or desirable.

The above process practiced in different manners and applied to several materials can best be explained by reference to the accompanying figures which show separate embodiments of novel apparatus for producing cellular core products by this new method.

With reference to FIGURE 1A, there is shown generally at 11 one apparatus for corrugating sheets of honeycomb strip material, and, as explained later, the elements for holding the corrugated strips in proper spaced relation while curing and bonding.

A pair of side rails 12 each have a plurality of equally spaced hexagonal openings 13 which house the ends of close fitting hexagonally shaped major rods 14. Between each of the major rods 14 there are placed a series of hexagonal minor rods or mandrels 16 of the same cross section as 14, the difference between the major and minor rods being that the major rods are longer than the minor rods and the major rods only are fitted securely in the openings 13 in each of the rails 12. Minor rods 17, of the same shape and cross section as rods 16, are placed between each of the latter to form a second row of minor rods. As best seen in FIGURE 1B, after placement of the second row of minor rods 17, the vertical distance from the uppermost flat surfaces of hexagonal rods 16 to the uppermost flat surfaces of hexagonal rods 14 is greater than the edge distance from openings 24 in disc 21 of corrugating roller 19 to be explained in greater detail hereinafter.

A first cut sheet of ribbon material 18a, either by itself or between sheets of aluminum foil, a technique to be explained later, is placed on top of the minor rods 17. A corrugating roller indicated generally at 19 is brought into position at one end of the pair of rails 12 preparatory to the actual corrugating process more fully described below.

When a thin film of a polyimide plastic precursor or fabric reinforced polybenzimidazole sheet for example, is used for sheet ribbon material 18a, it is first heated to its plastic or softening temperature before placement on the minor rods for corrugation. At ordinary temperatures, sheets of the above materials are frangible; if the material has not been thermocured, i.e. elevated and maintained for a given period of time at a certain characteristic curing temperature, it may be heated to its softening temperature at which such sheets are easily and accurately deformed, as by corrugation, without damage.

At their softening temperature, polybenzimidazole and the polyimides become tacky and tend to stick to objects with which they are brought into contact, e.g., the corrugating roller and mandrel rods described earlier in this specification. Thus a step is introduced in the novel process of this invention when using such plastics whereby the apparatus that comes into contact with the ribbon material is caused to be protected against direct contact with the plastic when at elevated temperatures, i.e., softening or curing temperatures. One embodiment of this step of the process is to coat rods 14, 16, 17 and 23 with a light layer of a separating or parting agent such as an aqueous suspension of colloidal graphite or other organic material prior to corrugating.

Another embodiment or variant of the above described step of apparatus protection is to form a composite sandwich of the plastic ribbon material between two layers of ordinary aluminum foil about .0025" thick as shown in FIGURE 11 and explained hereinafter. Such sandwich formation may be substituted for the step of coating the corrugating roller and various rods, described in the preceding paragraph and may be combined with another apparatus embodiment of this invention for continuously corrugating plastic ribbon material, which shall be explained in greater detail hereinafter. The coating with a parting agent of the various holding rods, however, is preferred in some embodiments of this invention for the steps of curing and bonding the formed ribbon material held in fixed position and under application of heat and mild pressure, steps to be described in some detail below.

Corrugating roller 19, an enlarged portion of which is shown in FIGURE 1B, consists of two parallel spaced discs 21 in each of which there is a plurality of hexagonally shaped openings 22 equidistantly spaced near the circumference of the discs. Rods 23 have the same cross section as mandrels 14, 16 and 17, are longer than minor rods 16 and 17; and, in the particular embodiment shown, shorter than the interval between rails 12. Rods 23 may be made longer than minor rods 16 and 17 so that discs 21 are disposed on the outside of rails 12. I have used this embodiment, but it is not shown on the accompanying drawings. Each end of rods 23 is shaped to fit snugly in openings 22 thus forming a squirrel cage type corrugating roller 19. A flat side of each of hexagonal rods 23 is arranged to face outwardly from the center of discs 21. The spacing of holes 22 and rods 23 indicated by the cord distance 24 is substantially equal to pitch 26 of the major and minor rods.

As roller 19 is caused to rotate in the direction of arrow 26 and commence motion in the direction of arrow 27 from one end of the rails 12 at the left hand side of the FIGURE 1A toward the right hand side of the figure, rods 23 impress sheet 18a between minor rods 17 forming corrugations comprising alternate ridges and depressions, i.e., alternate convolutions 29 and obverse convolutions 31, the latter indicated in FIGURE 1B.

After corrugating a first sheet 18a, said sheet is removed and set aside for subsequent processing described hereinafter. A second sheet 18b, of the same size and pattern as sheet 18a before corrugation, is placed on rods 17 in the same position as was sheet 18a before. Again corrugating roller 19 is placed in position preparatory to corrugating. Where sheet 18b is of thermosetting plastic material with a softening temperature as explained above, the sheet is heated to said softening temperature just prior to placement on rods 17 and corrugating. After corrugation in the same manner as described above, sheet 18b is removed and set aside for subsequent processing. This procedure is repeated for sheet 18c and successive sheets 18d, e, etc., until a predetermined number of corrugated half-cell sheets or ribbons are prepared.

After corrugating sheets 18a, b, c, etc., all minor rods are removed from their previous placement between major rods 14, and first sheet 18a is placed with its alternate convolutions fitted onto major rods 14 between rails 12 as shown in FIGURES 5 and 6. After such initial layer of corrugated ribbon material 18a is placed, a series of minor rods 16 are placed in the depressions of the obverse convolutions of the ribbon between its alternate convolutions. Second sheets 18b is then placed with its alternate convolutions over minor rods 16, and minor rods 17 are placed in the depressions of the obverse convolutions of sheet 18b. Sheet 18c is then placed down so that its alternate convolutions fit over the exposed portions of minor rods 17 and a successive row of minor rods 17 are placed in the depressions formed by sheet 18c's obverse convolutions. The above described steps are repeated for successive corrugated sheets 18d, e and f. After placing sheet 18f with its alternate convolutions fitted over a row of minor rods 17, a second set of rails 12 with major rods 14 are placed in the depressions formed by the obverse convolutions of sheet 18f, and the steps above described for sheets 18a through f are again repeated for subsequent sheets using additional rods 16 and 17 until the desired depth of honeycomb structure is formed and held together by the minor rods or mandrels 16 and 17 and the major rods and rails 14 and 12, respectively.

Minor rods 16 and 17 may also have vertical guide holes 33 uniformly spaced from the rod ends and a distance from each other greater than the width of sheets 18a, b, c, etc. The guide holes of minor rods which are vertically disposed with respect to each other are caused to be in vertical axial alignment. Vertical stabilizing rods 34 are inserted through each such group of vertically aligned holes to give added support to the individual rods thereby maintaining stability and alignment of the entire major and minor rod system if required.

An alternate apparatus for stacking and holding the pre-corrugated half-cell honeycomb material is shown in FIGURE 3. A box figure is indicated generally at 41 having opposite sides 42 and 43 held in fixed, spaced, and parallel relationship by ends 44 and 46. Sides 42 and 43 have a series of vertical slots 47 whose center-to-center distance is equal to the rod interval 26 defined earlier as the distance between major rods 14 and the pitch of the honeycomb structure to be formed. With reference to FIGURE 4, a plurality of major rods 48 are first inserted with their opposite ends in each of slots 47. A first corrugated sheet 18a, prepared as described hereinabove, is placed with its alternate convolutions fitted over major rods 48, and minor rods 49 are placed in each obverse convolution of sheet 18a between major rods 48. A second sheet 18b is then placed with its alternate convolutions fitted over minor rods 49, and a second row of major rods 48 are placed in each obverse convolution of sheet 18b. Vertical rods similar to 34 (but not shown) may be inserted in guide holes 51 provided uniformly near the ends of major rods 48 and in guide holes 52 placed uniformly near the ends of minor rods 49. The interval between pairs of holes 51 and 52 is greater than the width of sheets 18a, b, c, etc. The steps of placing corrugated sheets 18c, d, etc., are repeated with subsequent rods or mandrels 48 and 49 which are placed with the vertical rods inserted through guide holes 51 and 52. The vertical rods maintain alignment of all mandrels and stability of the entire stack as the placement of successive sheets 18c, d, etc., and major and minor rods 48 and 49 is repeated until a desired depth of honeycomb structure within box 41 is built up.

After a stack of alternate layers of jigged rods or mandrels and corrugated polyimide or polybenzimidazole sheet material is constructed using either the apparatus shown in FIGURES 3 and 4, or 5 and 6, described above, the entire honeycomb configuration is subject to heating by any suitable means, as for example by caul plates 53a and heating platens 53b as partly shown in FIGURE 6. The entire jigged system is placed on the caul plates and then positioned between platens which are subjected to application of pressure and heat by known methods. The heat is transmitted by conduction throughout the entire system of rods 14, 16 and 17 or rods 48 between sides 42 and 43 of the alternate apparatus. The amount of heat and temperature level is controlled by thermostat probes inserted into the stack, a technique known in the art and not shown in the drawings. In addition the weight of the major and minor jigged rods 14, 16 and 17, or 48 and 49, assist in creating bonding pressure and pressure to prevent foaming of the plastic material at the interfaces of the nodes as heat is applied.

As the temperature of the individual polyimide or polybenzimidazole sheets 18a, b, c, etc., is elevated to the curing temperature of such polymers, the adjacent points of contact of the corrugated sheets, i.e. along the node lines, cohesively fuse together forming a bond, and irreversible polymerization of the molecular structure occurs which rigidifies and makes permanent the corrugated shape of the sheets.

Because rods 14, 16 and 17, or 48 and 49, in their stacked relationship create a closed system which excludes exposure of the layers of sheets 18a, b, c, etc., to the atmosphere, no oxidation or other degradation occurs of the plastic material even though the initial heating and curing is carried out conveniently in the open.

Once the initial curing begins and the shape and bonding of the honeycomb structure becomes sufficiently set, rails 12 and rods 14, 16 and 17 of the apparatus shown in FIGURES 5 and 6, or box 41 with rods 48 and 49 of the apparatus shown in FIGURES 3 and 4, may be removed leaving the fixed honeycomb structure of ribbon material 18a, b, c, etc., in successive stacked layers. This removal is most easily accomplished using the device illustrated in FIGURE 8.

FIGURE 8 shows generally a removal tool 81 comprising side bar 82 and a series of equally spaced probe rods 83. The probe rods are spaced at intervals substantially equal to the center distance between a given row of major or minor rods in either of the aforementioned apparatus embodiments. When the honeycomb material has been sufficiently cured so that the entire honeycomb structure may stand without the support of the jigged fixture rods or mandrels, such rods are most easily removed by the following procedure: stabilizing rods 34, or, in the case of the apparatus shown in FIGURES 3 and 4, those inserted in holes 51 and 52, are first removed manually or by other means. In the case of the apparatus shown in FIGURE 3, box 41 is lifted away exposing the ends of rods 48 and 49. Tool 81 is then placed in position so that the spaced probe rods 83, which correspond in number and spacing to the major and minor rods in place in the honeycomb core structure, are in end to end alignment with said major and minor rods. By tapping holding bar 82 with equal pressure along its entire length, a given row of rods 14, 16 or 17, or 48 or 49, are moved from their position within the obverse or alternate convolutions of the now bonded plastic honeycomb ribbon material and, in the case of major rods 14, are also disengaged from their snug contact in the holes of rails 12. Once partially removed by the use of the tool 82, the rods may be completely removed from the honeycomb core by manual or other means.

Once the jigging rods have been removed by means of the special tool or other means and procedure described above the entire honeycomb structure, if necessary, may be placed in an environment controlled oven, i.e., free of oxidizing gaseous elements, and additional heat curing may be applied if necessary or desirable.

After the honeycomb half-cell ribbon material has been cured at an elevated temperature for a period of time and with the intensity required of the particular plastic material used, and after removal of the various holding rods and fixtures above described, a honeycomb core section indicated generally at 90 of FIGURE 7 is caused to be formed. Cell pitch 26 is shown between two typical cell openings 91 and 92. The cell nodes are shown generally at 93 wherein contacting innerfaces 94a and 94b are bonded together to form a homogeneous plastic continum of unusual strength. Also as a result of curing, typical cell lines 95a, 95b, and 95c, etc., are permanently set to a relatively irreversible, hardened and rigid molecular arrangement that is substantially impervious to environmetnal conditions such as temperature and moisture.

A double ply honeycomb ribbon may also be adapted to the apparatus and method described above by the novel procedure best described by reference to FIGURES 1C, 9 and 10. FIGURE 9 illustrates a cylindrical open ended envelope of fabric material indicated generally at 73 and having top surface 71 and bottom surface 72. A prepared sheet 74 of polyimide material is inserted into one end of the envelope between surfaces 71 and 72. The envelope of FIG. 9 may also be made by merely using a flat sheet of material similar to 73 doubled over insert 74 with a slight overlap of the encapsulating sheet. When such double ply material is heated to the softening temperature of sheet 74, the entire double ply arrangement of fabric envelope 73 and polyimide insert 74 may be corrugated in a manner and by means similar to fixture rods and a squirrel cage type roller 19 described in detail hereinabove with respect to sheets 18a, b, c, etc. When using the apparatus described in FIG. 1B, the envelope 73 and insert 74 may be passed between a pair of heating cauls such as plates 159 and 161 shown in FIG. 2. The heated envelope is then placed directly in the nip between corrugator 19 and rack assembly 11 with the corrugator at the extreme right hand side. The corrugator is then rotated by conventional mechanical means, and the entire envelope 73 is corrugated by being pulled directly from its heated condition between plates 159 and 161. When the corrugation is completed, the heating assembly may be withdrawn from the vicinity of rack 11 and roller 19 to avoid overheating by radiant transfer. The roller is then returned to the far end of rack 11 and a next pass as prepared for corrugation. FIGURE 1C shows such double ply material after corrugation wherein a first corrugated sheet 73a is indicated having a top corrugated surface 71a and a bottom surface 72a. The insert of polyimide plastic sheet 74a is shown also in corrugated form within the fabric material but still discretely separate from the fabric itself.

It is further understood from the above description that two ply fabric laminates with plastic inserts may be formed without using a fabric envelope. The fabric envelope form has been used satisfactorily and has certain advantages, e.g. forming a reinforced fabric edge, but my method of building up multi-layered laminates using sections of fabric and plastic may be applied to sheets of material as distinguished from fabric envelopes.

Successive corrugated double ply sheets 73a, b, c, etc., are formed and built up in stacked relationship utilizing either the apparatus shown in FIGURES 5 and 6 or 3 and 4 and in a manner similar to the formation of the stack hereinabove described for sheets 18a, b, c, etc. Bonding is initially accomplished when adjacent sheets of polyimide material 74 flow together through the interstices of the fabric layers of adjacent portions 71a and 72b, 71b and 72c, etc., shown in FIGURE 10, at the time of initial curing. Upon the application of additional heat for a period of time, the polyimide sheets 74a, b, c etc., are more completely dispersed through the fabric layers 71a, 72a, 71b, 72b, 71c, 72c, etc. and cured to a permanent shaped and bonded honeycomb structure.

Upon forming a sufficiently rigid structure as by bonding and curing, the holding apparatus similar to that described above in respect to sheets 18a, b, c, etc., and used herein, may be removed with the use of tool 81 in a manner similar to that described earlier. The resulting honeycomb core structure may then be further cured if necessary and desirable, and a final product such as that shown in FIGURE 10 is produced with sheets of adjacent material 73a, b, c, etc., of double ply layers 71a, 72a, 71b, 72b, 71c, 72c, etc., bonded together along adjacent cell nodes with the polyimide plastic material completely dispersed throughout the fabric layers and in permanent cell shape.

Referring now to FIGURE 2 there is shown generally at 151 apparatus for forming the corrugated sandwich of aluminum foil and plastic material referred to briefly earlier in this specification. A roll 152 of plastic material such as polyimide, or a fabric reinforced plastic, is mounted on a shaft with appropriate supporting members known in the art and not shown. The plastic web material 153 coming off of roll 152 turning in the direction of arrow 163 is conveyed between closely spaced aluminum foil rolls 154 and 156 rotating in the direction of arrows 164 and 166, respectively, and also mounted on proper axle supports with appropriate bearings and the like which are known expedients and omitted from the figure for purposes of clarity. Aluminum foil webbing 157 of width at least equal to that of plastic web 153 is conveyed from roll 154 into contact with the upper surface of plastic material 153 and at the same time webbing 158 also of width at least equal to that of plastic web 153 is conveyed from roll 156 into contact with the lower surface of material 153 to form an aluminum foil and plastic sandwich 168 which is conveyed in the direction of arrow 167 between two heating platens 159 and 161. Said platens are properly supported and electrically or otherwise heated by known methods not shown in the drawing. In passing between heating platens 159 and 161, plastic web 153 of sandwich 168 is elevated in temperature until at the point of passing from between the platens at opening 169 said web is elevated to the softening temperature of the particular plastic of which it is made. The temperature to which the particular plastic web material is elevated is controlled by the platens' length dimension 162; the speed with which the sandwich is conveyed between the heating platens, the temperature being a direct function of dimension 162 and an inverse function of the conveying speed; and the temperature to which the platens are elevated. As sandwich 168 leaves opening 169, it is conveyed through the nip of corrugating drums 171 and 172 rotating in the direction indicated by arrows 173 and 174, respectively. The drums are of a type known in the art, provided with corrugated flutes, and spaced to corrugate aluminum sandwich 168 to conform to the hexagonal half-cell configuration of major and minor rods 14, 16 and 17, as the sandwich is conveyed between said drums in the direction of arrow 177. The shafts on which drums 171 and 172 are supported, the method of powering the rotation of at least one of the shafts, and the other details of mounting the drums are known expedients and not further described herein nor shown on the accompanying drawing. During the process of corrugation, the heated plastic material is protected from direct contact with the corrugating flutes of drums 171 and 172 by the aluminum foil webbing 157 and 158 and hence prevented from sticking to said flutes. After corrugation, the component sheets of plastic 153 and aluminum foil 157 and 158 are separated so that the foil is removed from contact with the corrugated plastic sheet, or stripped off, as the corrugated sandwich emerges at the output side of drums 171 and 172 in region 176. Upon being conveyed further in the direction of arrow 177 to a point indicated by line 178, the corrugated plastic sheet material 153 is cut by any convenient means known in the art (not shown) to form corrugated sheets of desired uniform length dimension 179. A first such sheet 181a, similar to sheet 18a described earlier in this specification, is conveyed in the direction indicated by arrow 182 at the right hand side of FIGURE 2 and placed with its alternate convolutions on rods 14 between rails 12 in a manner similar to that described for the placing of sheets 18a, b, etc., earlier in this specification. Rods 16 are then placed in the depressions of the obverse convolutions of sheet 181a between rods 14. A second sheet 181b is then placed with its alternate convolutions fitting over the exposed portions of previously placed minor rods 16; successive sheets 181c, d, e, and f, are prepared and placed in the manner as described above for sheet 181a on successive rows of rods 17 to form a stack of honeycomb structure of a desired depth and similar to the type described earlier in this specification in reference to FIGURES 5 and 6 and, alternatively, FIGURES 3 and 4.

It is understood that the above described method for preparing the corrugated plastic sheets may be performed continuously for a number of cut lengths and then stacked in the manner above described utilizing the mandrels or rods shown, or the cutting and stacking may be done alternately with the placing of the rods.

The above described steps also may be practiced in a modified manner best understood with reference to FIGURE 11. First aluminum foils 257a of relatively heavy gage is folded to form upper surface 257b, edge 257c and lower surface 257d. A sheet of polyimide or fabric reinforced polybenzimidazole 253 is inserted within the fold of the foil, and a flat mat such as that shown generally at 259 is formed by pressing 257a closed. A second aluminum foil 258a, of the same thickness as 257a, is folded to form upper surface 258b, edge 258c and lower surface 258d. Mat 259 is then placed between the upper surface 258b and lower surface 258d of foil 258a pressing the upper and lower surface to completely enclose sheet 253 with aluminum foil having edges 257c and 258c at either lengthwise edge.

In lieu of second foil 258a, it is also sometimes the practice to make upper and lower surfaces 257b and 257d wider than the encased plastic sheet 253 which is in contact with the interior of edge 257c. In such case the excess on the side of the mat opposite edge 257c is sealed by any number of means known in the art and not included in the drawings.

An aluminum encased plastic sheet made by either of the steps described above is then passed through a corrugating apparatus of the type shown in FIGURE 2 except that rolls such as 154 and 156 are replaced by pinch rollers to convey the aluminum and plastic mat sandwich between heating platens similar to those shown at 159 and 161 spaced apart sufficiently to accommodate the aforementioned sandwich. As described earlier in the specification, heating between platens elevates the temperature of the plastic material within the mat to its softening temperature.

It is further understood that the sandwich techniques described above with reference to the FIGURES 2 and 11 of the drawings may be employed using, in lieu of web materials 153 or 253, double ply material of a type such as that described earlier in this specification with reference to FIGURES 1C, 9 and 10. After a stack of honeycomb structure has been prepared using double ply material such as that shown in FIGURE 9 processed by the apparatus of FIGURE 2, the material may be heated through and pressure applied by the use of caul plates 183a and heating platens 183b in a manner described earlier. After heating the plastic corrugated double ply ribbon material to its curing temperature sufficiently to form a fixed honeycomb structure, the holding apparatus composed of components similar to rails 12, rods 14, 16, 17 and stabilizing rods 34, or if the alternate holding apparatus embodiment is used, rods 48 and 49, may be removed. The resulting honeycomb structure may then be placed in an environment controlled oven, if such control is required, for further curing and treatment as necessary or desired.

The final honeycomb product of the above described process is of a type similar to that shown in FIGURE 10 having homogeneous adhered node surfaces and permanently formed cell wall structures.

Another embodiment of my invention utilizes metallic foil envelopes of a higher modulus of stiffness than that of the aluminum foil envelopes described above. Stiffer metallic foil may be used to incapsulate materials such as previously cured sheets or films of polyimide plastic. When such cured sheets are used, the material incapsulated is elevated to what is known as the glass transition temperature, in the case of the polyimide plastics in the neighborhood of 500° C. and higher, and then corrugated. At the glass transition temperature, the corrugation can be carried out with excellent response by the material; and, because of the complete incapsulation, there is no need to control the environment. Under these circumstances virtually no degradation occurs at the surface of the material thus preventing any discoloration or other deleterious effects. After the corrugation, the foil may be stripped from the plastic sheets and successive ribbons of the treated material adhered to one another at their node lines with the use of a polyimide adhesive by conventional techniques.

The incapsulation corrugation technique described above also may be applied to materials other than plastics or reinforced plastics, for example, tungsten foil. When tungsten foil is used as the ribbon material, a stainless steel envelope is used to incapsulate the ribbon material. The composite sandwich is heated to the plastic flow temperature of tungsten if that is the metal being processed and then corrugated. The stainless steel may be selectively removed from the nodes of the corrugated sandwich material, as by etching or other conventional removal techniques, and then the half cell ribbons may be stacked with the exposed nodes of adjacent layers in contact with one another. The effect of this technique is to utilize the residual stainless steel portions of the composite sandwich of stainless steel and tungsten foil in adjacent layers to form tubular hexagonal mandrels in each cell which support the insides thereof. Pressure and heat may now be applied to the entire honeycomb stack in a manner similar to that described above with respect to plastic materials held in rigid formation by solid hexagonal mandrels. After fusing together the exposed tungsten web material along adjacent node lines, the foil envelope may then be removed by treatment in an acid solution which attacks the foil but is inert to the tungsten honeycomb. The resulting product is similar to that shown in FIGURE 7 except that the ribbon material is now of a metallic material such as tungsten.

Still another example of my incapsulation method may take the form of incapsulating aluminum foil and polyethylene film by laminating the film to the foil under heat and pressure. After such a laminate is formed, the ribbons may be corrugated and laid up node to node. The corrugated aluminum form itself applies the necessary rigidity to the honeycomb stack which may then be subjected to selective amounts of heat and pressure. The polyethylene film between adjacent contacting nodes in the honeycomb strip are then cured to form an adhesive bond for adjacent ribbons, and finished aluminum honeycomb sections are produced with a protective covering of polyethylene film. The resulting product is not shown in the accompanying drawings but appears similar to that of FIGURE 10 except that the inner core material represented by the dotted lines are in bonded contact with those adjacent to it along the node regions. It is understood that the above steps employing metal foil incapsulated with a plastic film such as polyethylene may also be utilized with other techniques for bonding the exposed nodes of the core stack after the film is selectively removed therefrom by selective acid etching or similar known techniques. For example, the exposed node surfaces which are held in contact with each other may be bonded by means of diffusion welding or explosive welding techniques as shown in the Navord paper referred to earlier and the U.S. Patent No. 2,999,306 to Baxter. After treatment in accordance with such techniques, a product of the type similar to that shown in FIGURE 7 is obtained except that the honeycomb core ribbon material is metallic rather than plastic or fabric reinforced plastic. Adjacent node faces similar to those indicated at 93 in FIGURE 7 are fused together to form a homogeneous and unusually strong honeycomb core.

It is appreciated that the method and apparatus herein described may be applied to other members of the polyimide family available as a liquid varnish or paper impregnated materials; the varnish may be formed into sheets in clear plastic material and used with a double fabric ribbon envelope. Thus plastics may be utilized either directly in their common available forms or in variations available from such forms before being heated to their curing temperatures.

It is understood that the method described herein may be practiced by other means and upon other apparatus or manually, and the apparatus and products described in some detail by way of illustration and example in the foregoing specification are set forth solely for purposes of clarity and understanding. It is understood that certain changes and modifications may be practiced both in the novel method and apparatus taught herein within the spirit of the invention and scope of the appended claims.

What is claimed is:

1. A method of producing formed honeycomb from sheet material characterized by a curing condition which permanently sets the sheets in the shape held at time of curing, comprising the steps of: providing a plurality of corrugated sheets of said material having a series of spaced half-cells and node impressions shaped to correspond to the half-cells and nodes of said honeycomb; placing the first of said formed sheets on a holding fixture having a series of cross bars at spaced intervals and shaped in the same cross sectional form as the cells of said honeycomb; placing a series of cross bars of the same cross sectional shape as said holding fixture cross bars in the formed half-cell impressions of said first sheet; placing a second corrugated sheet of said material on the series of cross bars residing in the half-cells of said first sheet so that the nodes of the first sheet contact the nodes of the second sheet; placing successive sheets on cross on cross bars residing in the half-cells of preceding sheets in the steps above described until a formed honeycomb of desired depth is produced; applying said curing condition to permanently set said formed honeycomb of desired depth; bonding the said contacting nodes of said first, second and successive sheets to hold relatively permanently said formed honeycomb; removing said holding fixture and said series of cross bars.

2. A method of fabricating honeycomb section having a predetermined cell profile from sheets of material characterized by having a first condition at which said material is bendable and a second condition at which the material may be set relatively permanently to existing shape and bonded at mutually contacting surfaces, said sheets corrugated at said first condition to form corrugated webs having half-cells corresponding to said predetermined cell profile, comprising the steps of: providing a plurality of mandrel rods defining in cross section the predetermined cross section of the cells of the honeycomb section to be fabricated; placing a first row of said mandrel rods in adjacent parallel side-by-side relation whereby the upwardly facing surfaces of said rods define alternate and converse convolutions; placing a first said corrugated web in first condition on said first row of mandrel rods; placing a second row of said rods in the converse convolutions of said first formed corrugated web whereby the upper surfaces of said second row of rods define ridges projecting above the upwardly exposed areas of the alternate convolutions; placing a second said web on said second row of rods with the converse convolutions covering the projecting ridges of said rods and the alternate convolutions in contact with the converse convolutions of said first web; continuing to add successive rows of mandrel rods and corrugated webs in said first condition to provide a honeycomb structure of the desired number of corrugated ribbons; causing all of the adjacent contacting alternate and converse concolutions of the webs to be bonded together and the corrugations to become relatively permanently set by application of said second condition; and then removing said mandrel rods from said structure to define open cell honeycomb section.

3. A method of producing a formed cellular product from fabric sheets impregnated with polybenzimidazole and having a characteristic softening point temperature, at which said sheets may be bendably deformed, and a curing point temperature, at which the sheets may be set relatively permanently to existing shape and bonded at mutually contacting surfaces, comprising the steps of: heating each of said sheets to said softening point temperature; bendably deforming said sheets at said softening point temperature to form webs having a series of half cell impressions of alternate and converse convolutions with nodes forming a portion therebetween; providing a plurality of mandrel rods defining in cross section a cell profile whose half cell section corresponds to the half cell impression of the sheets formed by said step of bendably deforming; placing a first row of said mandrel rods in adjacent parallel side-by-side relation whereby the upwardly facing surfaces of said rods define a first row of alternate convolutions; placing the first of said webs on said first row of rods with the alternate convolutions of the first web covering said upwardly facing surfaces of the first row of rods; placing a second row of said mandrel rods in the converse convolutions of said first web, whereby the upwardly facing surfaces of said rods define a second row of alternate convolutions; placing the second of said webs on said second row of rods with the alternate convolutions of the second web covering said upwardly facing surfaces of the second row of rods whereby the node surfaces between converse convolutions of said first web and node surfaces between alternate convolutions of said second web are in contact with each other; repeating said steps of placing said webs and mandrel rods alternately to provide a cellular structure of the desired number of webs having said half cell impressions; heating said structure to said curing temperature to cause all of the adjacent contacting nodes of the webs to be bonded together and the corrugations to become relatively permanently set; and then removing said mandrel rods from said structure to define a formed cellular product.

4. In corrugating sheet material into strips having alternate and obverse convolutions with node surfaces between said convolutions, the combination of: a cage roller comprising a pair of spaced apart discs and a plurality of parallel rods extending lengthwise between said discs and connected near the peripheries thereof, said rods spaced apart a distance corresponding to the distance between alternate convolutions of said sheet material and shaped to conform to the profile of said convolutions; and a rack for cooperative rolling engagement with said cage comprising a pair of parallel separated rails and a plurality of parallel mandrels extending lengthwise between said rails and connected thereto, said mandrels spaced apart a distance corresponding to the interval between said rods and shaped to conform to the profile of said convolutions; whereby a sheet of said material placed between said rack and roller may be corrugated into a strip having alternate and obverse convolutions at spaced intervals by passing said roller cage in cooperative rolling engagement over said rack.

References Cited

UNITED STATES PATENTS

| 2,494,642 | 1/1950 | Case et al. | 156—588 X |
| 2,518,164 | 8/1950 | Meyer | 156—513 |
| 2,919,472 | 1/1960 | Steele | 156—197 X |
| 3,049,461 | 8/1962 | Beahm et al. | 156—197 |

FOREIGN PATENTS 3,128,801   6/1929   Great Britain.

EARL M. BERGERT, *Primary Examiner.*

H. F. EPSTEIN, *Assistant Examiner.*